Patented Jan. 15, 1929.

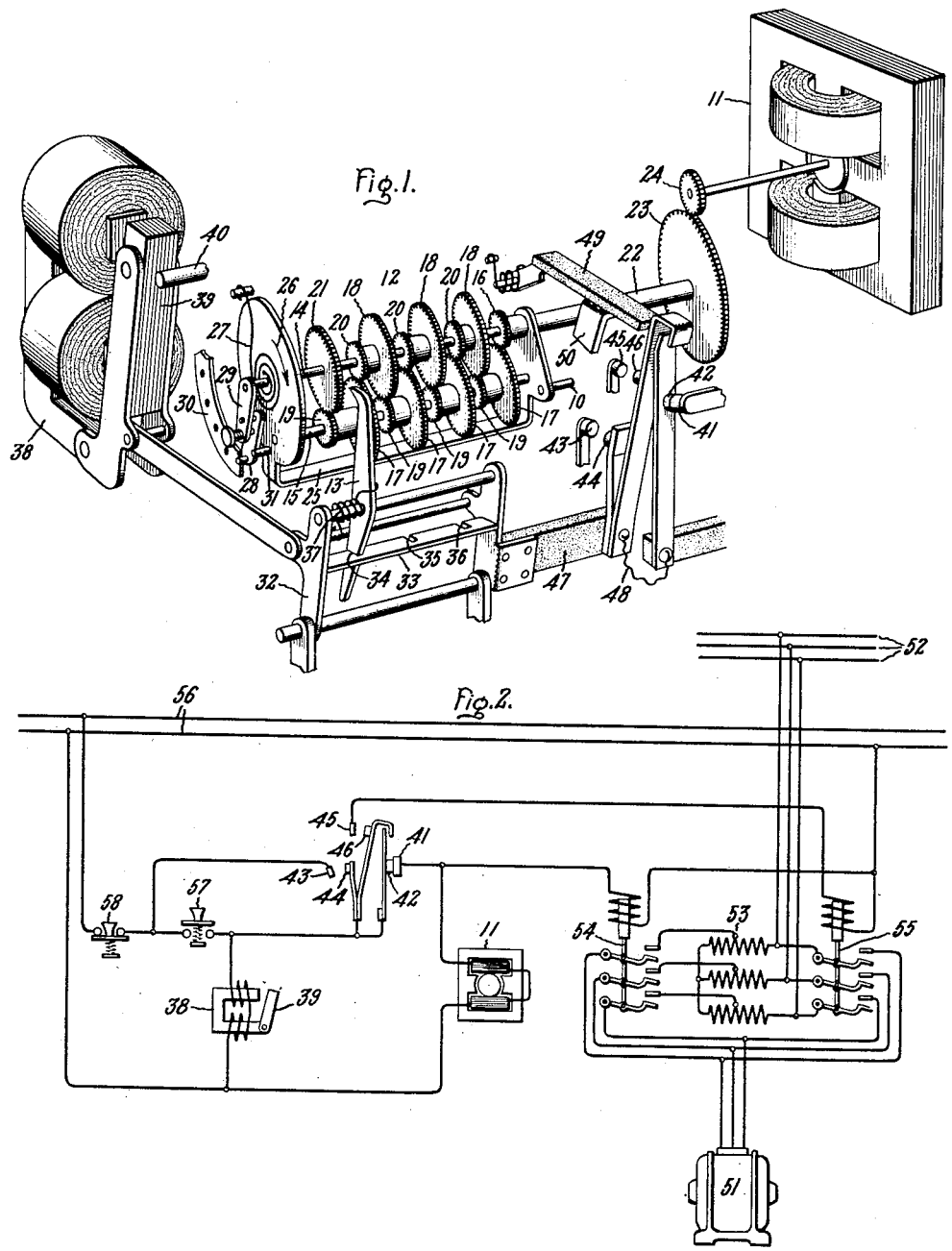

1,699,125

UNITED STATES PATENT OFFICE.

HUGH M. STEPHENSON, OF FORT WAYNE, INDIANA, ASSIGNOR TO GENERAL ELECTRIC COMPANY, A CORPORATION OF NEW YORK.

RELAY.

Application filed October 21, 1924. Serial No. 745,028.

My invention relates to improvements in relays and more particularly to improvements in definite time limit relays and an object of my invention is to provide an improved relay which has a dependable time limit action throughout a wide range in time intervals. Another object of my invention is to provide an improved definite time limit relay wherein a wide selectivity in time action is obtained by varying both the extent of movement and the speed of a movable member.

My invention will be better understood from the following description taken in connection with the accompanying drawing and its scope will be pointed out in the appended claims.

In the accompanying drawing, Fig. 1 illustrates in perspective an embodiment of my invention, and Fig. 2 illustrates diagrammatically an application of the embodiment of my invention, shown in Fig. 1.

Referring now to Fig. 1, a movable circuit controlling element 10 is arranged to be actuated by a motor 11 through a variable speed transmission indicated generally as 12 and comprising adjustably positioned means such as a clutch or pawl 13 whereby for any given speed of the motor 11 the speed of the element 10 can be changed. The motor 11 is shown as an induction motor although, so far as my invention is concerned, the type of motor used is immaterial but for definite time limit action, the motor 11 should be of the constant speed type.

The variable speed transmission 12 is of the planetary type and comprises relatively fixed and movable members, such as sun and planet shafts 14 and 15 respectively on which are rotatably mounted a plurality of constantly meshed sun and planet gears, 16, 17, 18, 19, 20 and 21. The gear 16 is mounted to rotate with a shaft 22 which may be driven directly by the motor 11 or through a suitable speed transforming mechanism such as the gears 23 and 24. The shafts 14 and 15 are arranged so that, when any one of the gears, 18, 20, 21, on the shaft 14 is held stationary, the shaft 15 will revolve around the shaft 14. For this purpose, the shaft 15 is mounted in a movable member such as a gear plate 25 which is rotatable on the shaft 14 and which is biased for movement to an initial position in the direction shown by the arrow 26 by any suitable means such as a spring 27.

The circuit controlling element 10 may be mounted directly on the gear plate 25 which, in order to vary the extent of movement of the element 10 so as to change the time action of the relay, is provided with suitable initial positioning means. This means comprises an adjustably mounted stop 28, which is arranged to be operated by a handle 29 so as to engage a position indicating plate 30, and a projection on the gear plate 25, such as a pin 31, which is arranged to abut the stop 28.

The sun and planet gears 16, 17, 18, 19, 20 and 21 comprise a plurality of relatively large and small gears, the number and gear ratios of which may be suitably chosen to provide the desired range in speeds of the element 10. Each of the large sun gears 18 is rigidly associated with a small sun gear 20 and similarly each of the large planet gears 17 is rigidly associated with a small planet gear 19. From the standpoint of practical constructional details, the gear ratio between each large gear and the small gear in mesh therewith may be the same.

Obviously with this gear arrangement, no movement of the gear plate 25 will occur when the motor 11 is energized unless some one of the sun gears 18, 20 and 21 is held stationary. If, however, one of the sun gears is held stationary, the plate 25 will be actuated at a speed depending upon which of the sun gears is held, the speed increasing for a given speed of the motor 11 as the number of gears in motion between the gear 16 and the sun gear held is decreased. In order to hold any one of a plurality of the sun gears 18, 21 stationary and to provide the desired speed range, the pawl 13 is slidably mounted on a pivoted cradle 32 so that it can be moved into any selected position opposite one of the sun gears 18, 21 and also into engagement with the opposed sun gear to hold it stationary. For holding the pawl 13 in the desired positions, the cradle 32 is provided with a notched member 33 into the notches 34, 35, 36 of which one end of the pawl is biased by a spring 37. In order to move the pawl 13 into engagement with the opposed sun gear, suitable means such as an electromagnet 38 having its armature 39 linked to the cradle 32 is provided.

When the pawl 13 is in notch 34 as shown and the electromagnet is energized, the pawl is moved to engage and hold the sun gear 21 and the speed or angular velocity of the circuit controlling element will be relatively small. With the pawl in notch 35, it will engage the next large sun gear 18 and the speed will be greater. With the pawl in notch 36, it will engage the next large sun gear 18 and the speed will be still greater. Thus, for any given initial position of the gear plate 25 a coarse speed adjustment, that is time variation, is obtained by varying the position of the pawl 13. For any given position of the pawl 13, a fine or micrometer speed adjustment, that is time variation, is obtained by varying the initial position of the gear plate 25 by means of the adjustably positioned stop 28. Upon de-energization of the electromagnet 38, the bias due to the weight of the armature 39 will return the cradle 32 to the position shown such that the pawl 13 is clear of the opposed sun gear or other suitable biasing means such as a spring may be used, the movement of the armature 39 to the unattracted position being limited by a stop 40.

For controlling the circuits of the motor 11 and the electromagnet 38 and one or more circuits which are to be controlled in accordance with a desired time action, a plurality of relatively movable cooperating contacts 41, 42, 43, 44, 45, and 46 are provided. The contacts 44 and 46 are mounted on an insulating member 47 movable with the cradle 32 and have a common connection 48 to the contact 42. The contact 46 is arranged when the electromagnet 38 is energized to abut a stop plate 49 which is biased for movement into a position in the path of movement of the contact 46. The stop plate 49 is arranged to be released at the expiration of the time interval for which the relay is set by the circuit controlling element 10 which engages a projection 50 on the stop plate and raises the stop plate clear of the contact 46. Upon movement against the stop plate 49, the contact 46 is flexed and is arranged upon the release of the stop plate 49 to engage contact 42 and effect the opening of contacts 41 and 42 with a snap action. The contacts 43 and 44 are closed upon energization of the electromagnet 38 and at the expiration of the time interval for which the relay is set the contacts 45 and 46 close and the contacts 41 and 42 open.

The operation of the embodiment of my invention shown in Fig. 1 will be explained in connection with Fig. 2 which illustrates an application of my invention to a motor control system for which definite time limit relays embodying my invention are particularly adapted although they can be used in general wherever a time limit action is desired such as in delaying the starting and stopping of automatic electric stations and the like.

In Fig. 2 a polyphase motor 51 is arranged to be connected to a supply bus 52 through a compensator 53 and a starting contactor 54 and also directly through a running contactor 55. For controlling the operation of the starting and running contactors in a definite sequence with a definite interval between the closing of the contactors, a relay similar to that shown in Fig. 1 is employed but for simplicity in the diagram, only the motor 11, the electromagnet 38, and the contacts 41 to 46 inclusive are shown. In this Fig. 2 as in Fig. 1, the contacts 41 to 46 inclusive are shown in the off position. The electromagnet 38 and motor 11 of the relay and the windings of the contactors 54 and 55 are arranged to be energized from an auxiliary low voltage bus 56 which may be energized from the supply bus 52 through potential transformers not shown. For controlling the relay and the starting and running contactors, start and stop switches 57 and 58 respectively are provided.

Assuming now that the parts are positioned as shown in Figs. 1 and 2 and that it is desired to start the motor 51, the start switch 57 is closed. This completes the circuit of the electromagnet 38 and the circuits of the relay motor 11 and the energizing winding of the starting contactor 54 through relay contacts 41 and 42. Upon energization of the electromagnet 38, the cradle 32 is moved to the running position, the pawl 13 engages the opposed sun gear 21, for the illustrated position of the pawl, the contact 46 is flexed against the stop plate 49 and the contacts 43 and 44 are closed so that the circuits of the electromagnet 38, and the relay motor 11 are sealed in. Since the opposed sun gear is now held by the pawl 13, the circuit controlling element 10 is caused to rotate at a speed dependent upon which of the sun gears is held and will release the stop plate 49 from the contact 46 after a time dependent upon which of the sun gears is held and also upon the extent of angular movement of the element 10, that is its initial position. When the stop plate 49 is released, the contact 46 under its flexure snaps open contacts 41 and 42 and closes on contact 45. Upon the opening of contacts 41 and 42, the circuits of the relay motor 11 and the energizing winding of the starting contactor 54 are opened, but the circuit of the electromagnet 38 remains closed since it is sealed in through contacts 43 and 44 which remain closed. Upon the closing of contacts 45 and 46, the circuit of the energizing winding of the running contactor 55 is completed and the motor 51 is on the line.

To stop the motor 51, the stop switch 58 is opened thus interrupting the circuits of the electromagnet 38 and the energizing winding of the running contactor 55. Consequently the armature 39 moves to the unattracted position against the stop 40 causing the cradle 32 to move to the position shown in Fig. 1. The pawl 13 is therefore released and the contacts return to the off position shown in Fig. 1, contacts 42 closing on contact 41. It will be apparent that these contacts 41 and 42 which are closed in the off and starting positions of the relay are not disturbed by the movement of the armature 39 to the attracted position. Upon the release of the pawl 13, the gear plate 25 under the bias of spring 27 returns substantially instantaneously to its initial position with pin 31 against stop 28. In the return movement of the gear plate 25, the gear 16 tends to remain stationary because of the inertia of the gears 23 and 24 and the motor 11. Consequently, although there is a selective gear reduction depending on which of the gears 18, 21 is held for the movement of the circuit controlling member 10 to circuit controlling position, the time of the opposite or return movement is unaffected by the gear ratios and is therefore very short since all the gears 17, 18, 19, 20 and 21 are free to rotate on their respective shafts 14 and 15.

While I have shown and described only one embodiment of my invention, I do not desire to be limited to the exact arrangement shown and described but seek to cover in the appended claims all those modifications that fall within the true spirit and scope of my invention.

What I claim as new and desire to secure by Letters Patent of the United States, is:—

1. A time limit relay comprising a rotatable circuit controlling element, a motor for rotating said element, a planetary transmission between the motor and the element including a plurality of both sun and planet gears and adjustably positioned means for causing the torque of said motor to be transmitted through different portions of said transmission to said element whereby the speed thereof can be varied.

2. A definite time limit relay comprising a movable circuit controlling element, a constant speed motor for actuating said element, and a planetary transmission between said motor and said element comprising adjustably positioned means whereby the speed of said element can be changed.

3. A time limit relay comprising a movable circuit controlling element, a motor for actuating said element, a gear train between said motor and said element, and adjustably positioned means arranged to be operated to hold any one of a plurality of the gears in said train against movement whereby to effect movement of said element at different speeds.

4. A definite time limit relay comprising a rotatable circuit controlling element, means for rotating said element comprising a constant speed motor, and a planetary transmission between said motor and said element comprising a plurality of sun and planet gears and means arranged to be positioned to hold any one of a plurality of said sun gears against movement whereby the speed of said element can be varied.

5. A time limit relay comprising a motor and a contact controlling mechanism arranged to be actuated thereby, said mechanism comprising relatively fixed and movable shafts, a circuit controlling element mounted for movement by said movable shaft, a gear train comprising a plurality of gears rotatably mounted on said shafts, and means arranged to be positioned to hold any one of a plurality of the gears on said fixed shaft stationary whereby to effect movement of said movable shaft at different speeds.

6. A definite time limit relay comprising a movable circuit controlling element, means for actuating said element at a plurality of different predetermined speeds comprising a member arranged to be driven at a constant speed, a planetary gear train arranged to be driven by said member and comprising a plurality of sun and planet gears, and means for holding any one of a plurality of said sun gears stationary whereby to effect movement of said element at a speed depending on which of the sun gears is held.

7. A definite time limit relay comprising a movable circuit controlling element, means for actuating said element at a plurality of different predetermined speeds comprising a member arranged to be driven at a constant speed, a planetary gear train arranged to be driven by said member and comprising a plurality of sun and planet gears, and means arranged to be positioned opposite any one of a plurality of said sun gears and to be moved into a position to engage and hold the opposed sun gear whereby to effect movement of said element and whereby the speed of the element can be varied.

8. A definite time limit relay comprising a movable circuit controlling element biased to an initial position, means adapted to be operated to vary the initial position of said element whereby the extent of movement thereof to circuit controlling position can be varied, means for actuating said element comprising a constant speed motor and a planetary transmission between said motor and said element comprising a plurality of sun and planet gears, and means arranged to be positioned to hold any one of a plurality of said sun gears against movement whereby the speed of said element can be varied.

9. A time limit relay comprising a movable contact, a latch for preventing movement thereof to circuit controlling position and means for releasing the latch comprising a rotatable member, a planetary transmission comprising a plurality of sun and planet gears, means for actuating the planetary transmission, a pawl mounted for positioning opposite any one of a plurality of the sun gears, and means for moving the pawl to engage and hold the opposed sun gear against movement whereby to effect the release of said latch in a time depending on which of the sun gears is engaged by the pawl.

10. A time limit relay comprising a movable contact, a latch for preventing movement thereof to circuit controlling position and means for releasing the latch comprising a rotatable member biased to initial position, means adapted to be operated to vary the initial position of the rotatable member, a planetary transmission comprising a plurality of sun and planet gears, means for actuating the planetary transmission, a pawl mounted for positioning opposite any one of a plurality of the sun gears, and means for moving the pawl to engage and hold the opposed sun gear against movement whereby to effect the release of said latch in a time depending on the initial position of the rotatable member and which of the sun gears is engaged by the pawl.

In witness whereof, I have hereunto set my hand this 18th day of October, 1924.

HUGH M. STEPHENSON.